(12) United States Patent
Reiher et al.

(10) Patent No.: US 10,908,687 B2
(45) Date of Patent: Feb. 2, 2021

(54) PROVIDING REAL-TIME FEEDBACK TO A USER FROM STATES OF A MODEL PHYSICAL SYSTEM VIA A SURROGATE FUNCTION

(71) Applicant: ETH ZURICH, Zurich (CH)

(72) Inventors: Markus Reiher, Winterhur (CH); Moritz Haag, Zurich (CH); Alain Vaucher, Zurich (CH)

(73) Assignee: ETH Zurich, Zurich (CH)

( * ) Notice: Subject to any disclaimer, the term of this patent is extended or adjusted under 35 U.S.C. 154(b) by 387 days.

(21) Appl. No.: 15/765,125

(22) PCT Filed: Sep. 26, 2016

(86) PCT No.: PCT/EP2016/072844
§ 371 (c)(1),
(2) Date: Mar. 30, 2018

(87) PCT Pub. No.: WO2017/060113
PCT Pub. Date: Apr. 13, 2017

(65) Prior Publication Data
US 2018/0275758 A1 Sep. 27, 2018

(30) Foreign Application Priority Data
Oct. 5, 2015 (EP) ..................... 15188375

(51) Int. Cl.
*G06F 3/01* (2006.01)
*G05B 13/04* (2006.01)
(Continued)

(52) U.S. Cl.
CPC ........... *G06F 3/016* (2013.01); *G05B 13/044* (2013.01); *G06F 3/04842* (2013.01);
(Continued)

(58) Field of Classification Search
None
See application file for complete search history.

(56) References Cited

U.S. PATENT DOCUMENTS

| | | | |
|---|---|---|---|
| 7,979,243 B1 * | 7/2011 | Mosterman | G06F 8/34 703/2 |
| 2005/0124412 A1 | 6/2005 | Son et al. | |

OTHER PUBLICATIONS

Vaucher, Alain C et al., "Real-Time Feedback from Iterative Electronic Structure Calculations", Oct. 21, 2015. (Year: 2015).*
(Continued)

*Primary Examiner* — Cedric Johnson
(74) *Attorney, Agent, or Firm* — Cooper & Dunham LLP

(57) ABSTRACT

The present invention is notably directed to a computerized method for providing real-time feedback to a user from states of a model physical system, or MPS, via a computerized system comprising one or more processors and a user interface system, or UIS. The method comprises the following steps, each performed via the one or more processors. Configuration inputs are repeatedly received, to modify a configuration of the MPS, said inputs including user inputs received via said UIS. While receiving said configuration inputs: configurations of the MPS are updated based on the configuration inputs received; and a state of the MPS is repeatedly computed, whereby each computed state corresponds to a latest updated configuration that was available before starting to compute said each computed state. While repeatedly computing a state of the MPS: a surrogate function is obtained, upon completion of each computation, which surrogate function approximates a function of said each computed state; and at least one type of feedback is repeatedly provided via the UIS in respect to said user inputs received. Said at least one type of feedback is provided by sampling the configurations being updated and by evaluating a last surrogate function obtained, and/or a function
(Continued)

derived from it, according to the sampled configurations, at a frequency compatible with real-time user-interactivity. The present invention is further directed to related computerized systems and computer program products.

20 Claims, 6 Drawing Sheets

(51) Int. Cl.
  *G06F 30/20* (2020.01)
  *G06F 3/0484* (2013.01)
  *G06F 111/10* (2020.01)

(52) U.S. Cl.
  CPC .......... *G06F 3/04845* (2013.01); *G06F 30/20* (2020.01); *G06F 2111/10* (2020.01)

(56) References Cited

OTHER PUBLICATIONS

PCT International Search Report No. PCT/EP2016/072844, dated Dec. 21, 2016, completed on Dec. 14, 2016.
Moritz P. Haag et al., Chemphyschem Articles, "Interactive Chemical Reactivity Exploration", ChemPhysChem 2014, vol. 15, pp. 3301-3319.

\* cited by examiner

PROVIDING REAL-TIME FEEDBACK TO A USER FROM STATES OF A MODEL PHYSICAL SYSTEM VIA A SURROGATE FUNCTION

CROSS REFERENCE TO RELATED APPLICATIONS

This application is a § 371 national stage of PCT International Application No. PCT/EP2016/072844, filed Sep. 26, 2016, which claims priority to European Patent Application No. 15188375.8, filed Oct. 5, 2015, the contents of each of which are incorporated herein by reference in their entireties.

BACKGROUND

The invention relates in general to the field of computerized methods for providing real-time feedback to a user from states of a model physical system, or MPS, via a computerized system, as well as related computerized systems and methods. In particular, it is directed to methods for providing real-time feedback from states of a polyatomic system of interacting atoms or ions, where the feedback comprises a force feedback provided through a force feedback device.

In many scientific fields, the level of complexity involved in the calculations of model physical systems prohibits real-time user interaction.

For instance, chemical reactivity studies based on quantum mechanical calculations require the generation, analysis and organization of complex data. With currently available software, such tasks remain an unwieldy and non-intuitive process, which can only be performed by experts trained in computational chemistry. In addition, the typical durations and/or the unpredictability of durations of rigorous quantum mechanical calculations are incompatible with real-time user interaction requirements. Providing a real-time response based on such calculations has not been addressed yet. It is commonly believed that it is impossible to meet any hard real-time requirement with such calculations.

As it can be realized, a similar problem arises in other fields in physics, chemistry or biology, etc. More generally, in virtual exploration scenarios, the temporary unavailability of data (due to the amount of data temporarily needed) may prevent or impair true interactivity, as the latter requires a quasi-instantaneous response of a system to structural or other manipulations.

A solution has been developed (M. P. Haag, A. C. Vaucher, M. Bosson, S. Redon, M. Reiher, Interactive Chemical Reactivity Exploration. ChemPhysChem, 15 (2014), 3301-3319, where a haptic pointer device with force feedback is employed, to allow direct manipulation of structures in three dimensions along with simultaneous perception of the quantum mechanical response (as forces) upon structure modification by the operator. The method proposed accordingly provides some user interactivity. This method, however, is based on a simplified quantum mechanical treatment of molecules, involving a non-iterative method that has predictable execution times. The underlying quantum mechanical treatment is here simplified to an extent enabling short calculation durations, which, in turn, enable user-interactivity. However, the simplified quantum mechanical treatment has very limited applications.

Present inventors took up the challenge of devising a solution, which would enable quasi-instantaneous responses as required by true interactivity, irrespective of constraints inherent to the computation of the model physical system, be it in terms of (unpredictable) duration or time duration of the computation.

SUMMARY

According to a first aspect, the present invention is embodied as a computerized method for providing real-time feedback to a user from states of a model physical system, or MPS, via a computerized system comprising one or more processors and a user interface system, or UIS. The method comprises the following steps, each performed via the one or more processors. Configuration inputs are repeatedly received, to modify a configuration of the MPS, said inputs including user inputs received via said UN. While receiving said configuration inputs: configurations of the MPS are updated based on the configuration inputs received; and a state of the MPS is repeatedly computed, whereby each computed state corresponds to a latest updated configuration that was available before starting to compute said each computed state. While repeatedly computing a state of the MPS: a surrogate function is obtained, upon completion of each computation, which surrogate function approximates a function of said each computed state; and at least one type of feedback is repeatedly provided via the UIS in respect to said user inputs received. Said at least one type of feedback is provided by sampling the configurations being updated and by evaluating a last surrogate function obtained, and/or a function derived from it, according to the sampled configurations, at a frequency compatible with real-time user-interactivity.

In other words, the present method institutes a surrogate function acting as a temporary mediator, which approximates the true function. The surrogate function is designed and constructed so as to be quickly evaluated and, this, potentially for each of the sampled configurations, which are constantly updated as per user interactions. Thus, the surrogate function allows quasi-instantaneous responses to be obtained, as required by true interactivity. This makes it possible to enable real-time user-interactivity even if the computation of the true function that the surrogate function(s) approximate(s) prevents it. In particular, the present solution provides quasi-instantaneous responses, independently from the complexity and/or unpredictability of the computation of the states of the model physical system. Still, each surrogate function is obtained based on a rigorously computed state of the system and is refreshed, as often as possible to maintain a reasonable accuracy.

This mediator allows the various processes involved to operate at distinct frequencies, if needed. In particular, in embodiments, updating the configurations of the MPS is performed at one or more first frequencies, while a state of the MPS is repeatedly computed, at a second frequency. One or more types of feedback are repeatedly provided, by sampling the configurations at one or more third frequencies, respectively. In variants, the first frequency is chosen to be equal to one of the third (feedback) frequencies. In all cases though, said second frequency is, on average, lower than at least one of the third (feedback) frequencies. Notwithstanding, the surrogate function allows quasi-instantaneous responses to be obtained to enable true interactivity.

In embodiments, the above method may further include one or more of the following features.

The MPS is a system comprising multiple, interacting components and the surrogate function is a surrogate potential energy impacting the interacting components, according to the MPS. In addition, repeatedly computing a state of the MPS comprises repeatedly executing calculations of a state of the MPS, each of the calculations being started based on said latest updated configuration;

The MPS is a polyatomic system of atoms or ions interacting with each other, where an electronic configuration of the polyatomic system notably depends on a geometrical structure of the polyatomic system. The configuration inputs received comprise structural inputs to modify a geometrical structure of the polyatomic system and each of the calculations is an iterative electronic structure calculation, started based on a latest updated configuration of the polyatomic system that was available before said one or more processors were able to start said each of the calculations. In addition, upon completion of said each of the calculations, an energy is obtained, which corresponds to a latest updated configuration based on which said each of the calculations was started, and the surrogate potential energy obtained approximates said energy for said latest updated configuration. Advantageously though, the surrogate function can be quickly evaluated for any configuration as changed as per the user interaction process, to enable user-interactivity even though an iterative electronic structure calculation may not;

Different types of feedback can be contemplated, independently or even in combination. For instance, a first type of feedback is provided, whereby a dynamic relaxation of the MPS occurs. The relaxation is computed based on: a last surrogate function obtained; and a last updated configuration that was available before starting to compute said dynamic relaxation. The computed dynamic relaxation causes to change a configuration of the MPS as it relaxes. A changed configuration will be received as new configuration inputs;

The UIS comprises a display, and the configurations of the MPS that are being modified as per the computed dynamic relaxation and the received user inputs are both displayed on the display;

The configuration inputs received comprise both the user inputs and changes in the configuration of the MPS due to the computed dynamic relaxation; the MPS is a system comprising multiple, interacting components; the user inputs received are restricted to a first subset of the interacting components; and the dynamic relaxation is restricted to a second subset of the interacting components that is distinct from said first subset. This way, both the user inputs and changes in the configuration of the MPS due to the computed dynamic relaxation are simply reconciled;

A feedback is provided by sampling the configurations being updated at a frequency that is equal to a frequency at which the configurations of the MPS are displayed; and the evaluation of a last surrogate function obtained (and/or a function derived from it) preferably comprises checking for a last surrogate function obtained at that same frequency, equal to the frequency at which the configurations of the MPS are updated;

The UIS may further comprise a force feedback device (i.e., a haptic pointer device with force feedback). The user inputs may thus be at least partly received via the force feedback device. User inputs received via the force feedback device may for instance comprise selecting a component of the MPS and moving (or dragging) the selected component to modify a configuration of the MPS. A second type of feedback (force feedback) can further be provided via the force feedback device. This can be achieved by sampling the configurations which are concurrently updated and by evaluating a last surrogate function obtained (or a function derived therefrom) according to the sampled configurations, at a fourth frequency. The force feedback may for example simulate a force "experienced" by a component of the MPS as selected via the force feedback device. More generally, a force feedback device may allow direct manipulation of structures or virtual movements, in three dimensions, along with simultaneous perception of the response of the system upon modification;

Each surrogate function obtained upon completion of each computation of state is constrained to be a continuously differentiable, strictly convex function, bounded from below, to prevent erratic or even painful force feedbacks;

A duration of each of the repeatedly executed computations of state is inherently unpredictable, owing to a method used for said computations;

The MPS is a polyatomic system of atoms or ions interacting with each other; said configurations are electronic configurations of the atoms or ions of the MPS, which electronic configurations notably depend on a structure of the polyatomic system, and repeatedly computing a state of the MPS comprises repeatedly executing calculations of a state of the MPS, each of the calculations being an iterative electronic structure calculation; and the method used for said calculations is an ab initio quantum chemistry method, e.g., an iterative optimization method; and Said at least one third frequency may comprise a third frequency and a fourth frequency, each being respectively associated to a first type of feedback and a second type of feedback, the latter involving a force feedback device, wherein the first frequency is equal to the third frequency and is between 10 and 100 Hz; and the fourth frequency is between 0.1 and 10.0 kHz.

According to another aspect, the invention may be embodied as a computerized system for providing real-time feedback to a user from states of a MPS, wherein the computerized system comprises one or more processors, a user interface system, or UIS, and stores a computerized method, which, upon execution via the one or more processors, causes the system to implement steps of a method according to embodiments.

In addition, and according to a final aspect, the invention can be embodied as a computer program product for providing real-time feedback to a user from states of a MPS, the computer program product comprising a computer readable storage medium having program instructions embodied therewith, the program instructions executable by one or more processors of a computerized system such as described above to cause the system to implement steps of a method according to embodiments.

Computerized systems and methods, as well as computer program products embodying the present invention will now be described, by way of non-limiting examples, and in reference to the accompanying drawings.

BRIEF DESCRIPTION OF SEVERAL VIEWS OF THE DRAWINGS

FIG. 5 also depicts a convex surrogate potential $f_n$ approximating the energy E(x, y) at a given point $(x_0, y_0)$ in the plane (x, y), as constructed after a $n^{th}$ computation of state, for a configuration $C_n$ corresponding to said given point $(x_0, y_0)$;

The accompanying drawings show simplified representations of devices or parts thereof, as involved in embodiments. Similar or functionally similar elements in the figures have been allocated the same numeral references, unless otherwise indicated.

DETAILED DESCRIPTION OF EMBODIMENTS OF THE INVENTION

The following description is structured as follows. First, general embodiments and high-level variants are described (sect. 1). The next section (sect. 2) addresses more specific embodiments and technical implementation details.

1. General Embodiments and High-Level Variants

Figure 1:
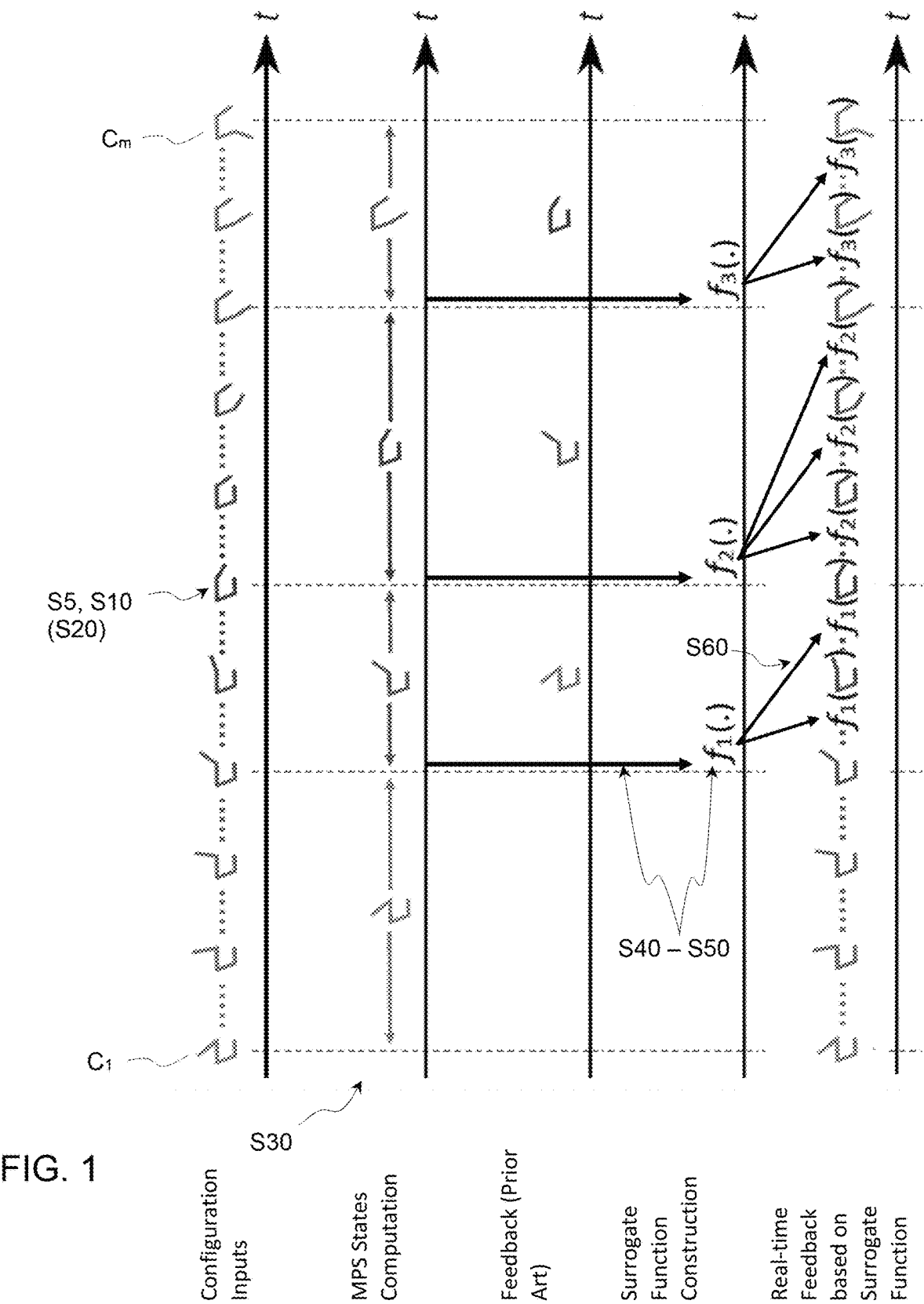
FIG. 1 schematically depicts the construction of a surrogate function and its use to provide real-time feedback in respect of molecule configurations being constantly modified as per configuration inputs received from a user and a relaxation process, according to embodiments. Temporality constraints in respect of some types of feedback (third row) reflects a situation as it already occurs in the prior art.
Figure 2:
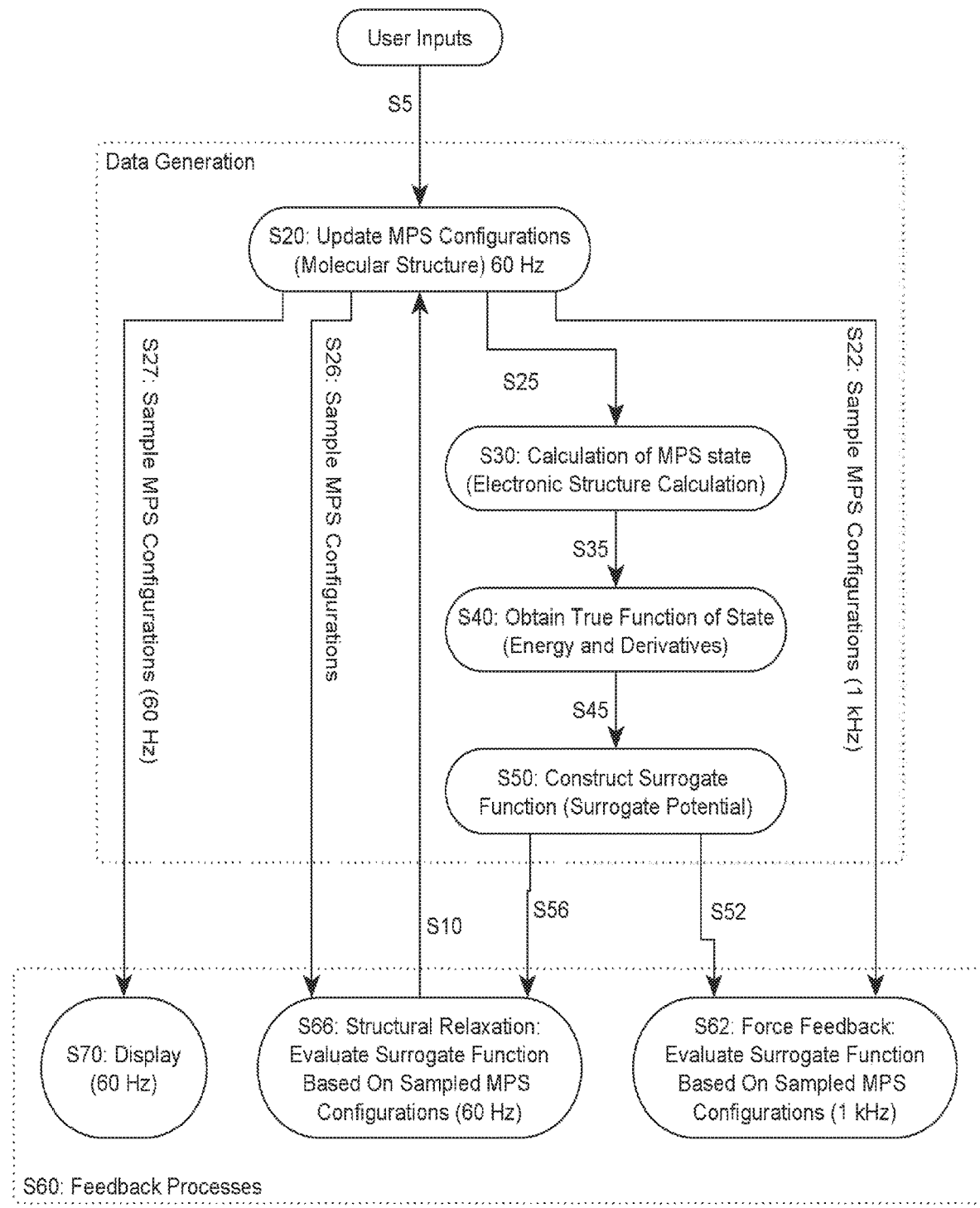
FIG. 2 is a flowchart illustrating high-level steps of a method for providing real-time feedback to a user from states of a MPS, according to embodiments. Both the nodes and edges of the flowchart represent steps of the method.
Figure 3:
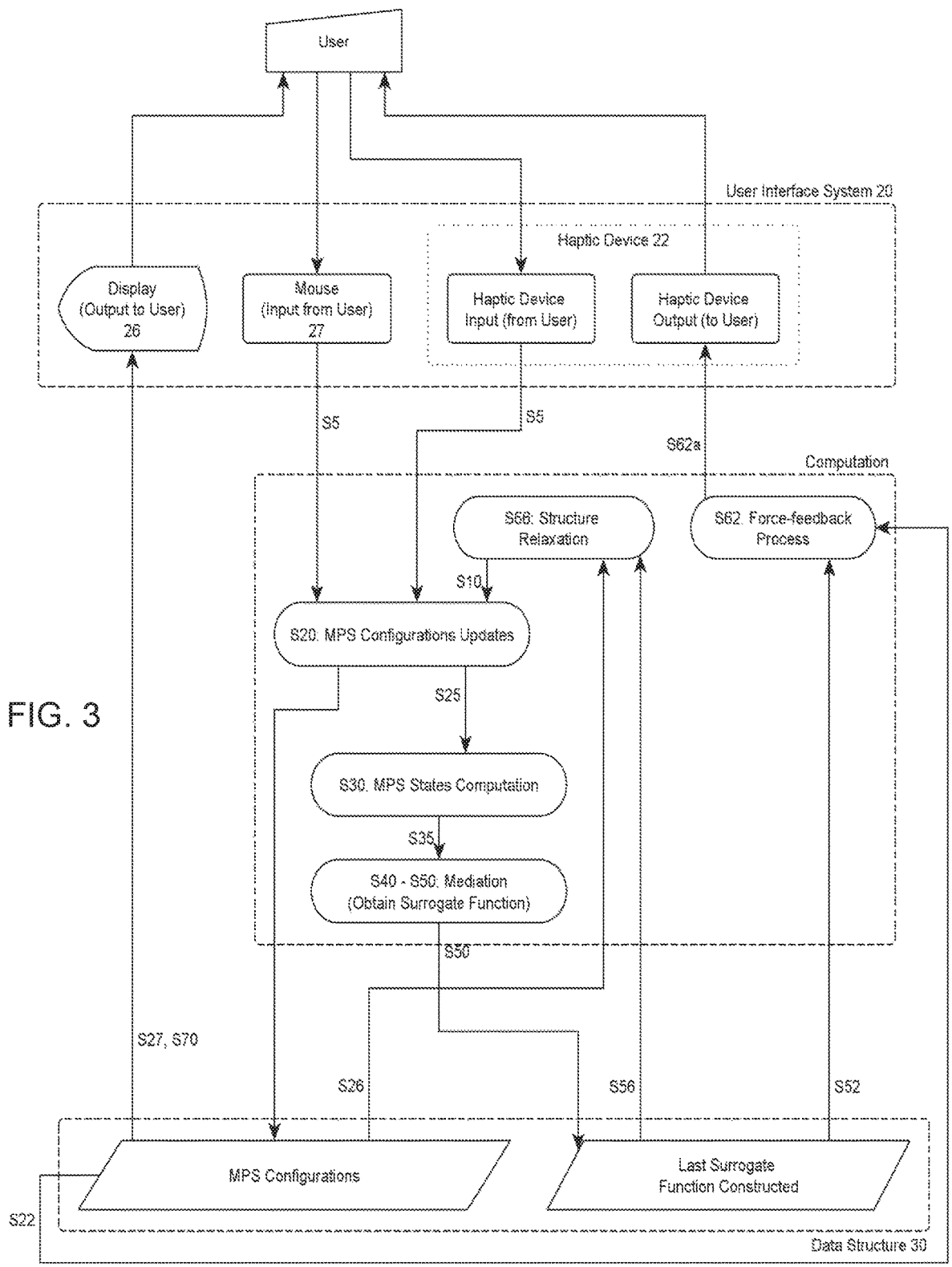
FIG. 3 is a diagram illustrating interrelations between selected components of a computerized system (according to embodiments) and method steps as in embodiments.
Figure 7:
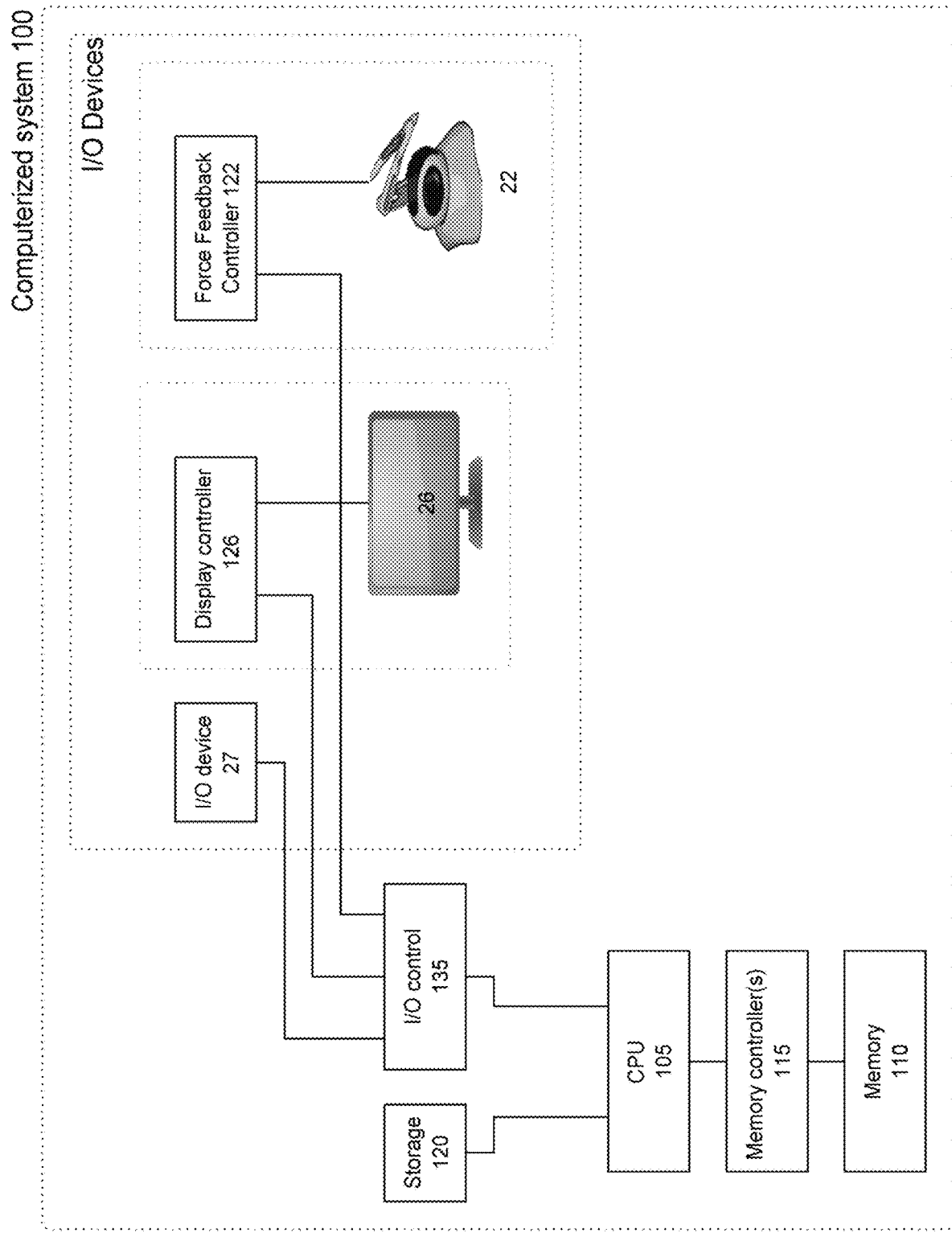
FIG. 7 schematically represents a computerized system, notably comprising a force feedback device, and suited for implementing one or more method steps as involved in embodiments of the invention.

Referring more specifically to FIGS. 1-3, an aspect of the invention is first described, which concerns a computerized method for providing real-time feedback to a user from states of a model physical system, or MPS, via a computerized system 100. Such a system 100 is generally illustrated in FIG. 7, though some of its components are already depicted in FIG. 3, and will be described later in detail (sect. 2). The computerized system 100 notably comprises one or more processors and a user interface system 20, or UIS.

Basically, the present method comprises the following steps, which are each performed via one or more processors (or processing elements) of the system 100:

As the user interacts with the UIS 20, configuration inputs are repeatedly received (steps S5 and S10 in FIGS. 1-3), which inputs, in turn, cause to modify a configuration $C_1, \ldots, C_m$ of the MPS. The inputs received include user inputs received S5 via said the UIS 20. The inputs received may possibly include additional inputs as caused by a relaxation of the MPS, which can be computed in parallel to (but jointly with) the user-interactive process. Note that the MPS is assumed to be a molecule in the example of FIG. 1, as denoted by the skeletal formula used therein;

While receiving S5, S10 the configuration inputs:
  Configurations of the MPS are updated S20 based on the configuration inputs received at steps S5 and S10; and
  A state of the MPS is repeatedly computed, step S30. Each computed state corresponds to a latest updated S20 configuration that was available before starting each computation (i.e., of said each computed state).
  Now, while repeatedly computing S30 a state of the MPS:
    A surrogate function $f_1, \ldots, f_n$, is obtained S40-S50, upon completion of each computation S30. The surrogate function accordingly obtained approximates a "true" function, e.g., an energy, of said each computed state; and
    One or more types of feedback are repeatedly provided S60 via the UIS 20 in respect to said user inputs received S5.

The various types of feedback as contemplated herein are provided S60 by sampling S22, S26 the configurations that are concomitantly updated S20, and by evaluating S62, S66 the last surrogate function obtained S50 (and/or a function derived from it) according to the sampled S22, S26 configurations. I.e., a surrogate function takes parameters pertaining to a configuration of the MPS (or at least part thereof) as argument. A surrogate function is constructed so as to be quickly evaluable, i.e., at a frequency compatible with real-time user-interactivity.

Note that the terminology "real-time" as used above pertains to user-interactivity requirements in terms of user inputs obtained from and feedbacks provided to the user, via the UIS 20. This terminology does not apply to the underlying model system's characteristic responses, e.g., characteristic relaxation times or times of evolution of the MPS, which may typically need to be scaled to an order of magnitude compatible with the human brain perception, as known, e.g., in molecular dynamics simulations.

The user interface system 20, or UIS (FIGS. 3, 7) is a system that may include several components, e.g., a graphical user interface 26, or GUI, to provide visual feedback (such as rendering a molecule as it relaxes), as well as haptic controls to receive user inputs, such as a mouse and/or a force feedback device. When a haptic force feedback device 22 is used, user inputs can notably be received via the latter. The user inputs tend to modify a state of the system, e.g., a configuration of a molecule (as assumed in FIG. 1), while a force feedback can concomitantly be provided to the user in respect to the modified configurations, via the device 22. More generally, the UIS 20 may comprise any type of haptic, visual or audio devices, which may be used to receive the user inputs and/or provide feedback to the user.

The user inputs as to the MPS configuration may occur at any unpredictable time, depending on the way the user interacts with the UIS 20, as in virtual exploration, e.g., exploratory chemistry. However, the modified configurations of the MPS (as notably modified by the user inputs) may typically be updated at a constant frequency. In fact, distinct frequencies may be used for updating the configuration inputs that may possibly be received via separate channels (e.g., mouse, force-feedback device, relaxation process), which frequencies are typically constant. The largest frequency used for updating the configuration inputs determines the apparent frequency (call it "first" frequency) at which the configurations are updated. In practice, the updated configurations may be stored in a data structure 30 (FIG. 3), which stores the latest updated configuration.

Older configurations may also be kept in memory, if necessary (e.g., to refine the construction of the surrogate functions).

The repeated computations of states are performed at a second frequency, which will typically be non-constant and/or too low. This is notably the case for embodiments involving electronic structure calculations, which are inherently of unpredictable durations, as described below in detail. As such, the second frequency is inadequate for providing real-time feedback based on the sole rigorous computation of the states of the MPS.

The one or more feedbacks are provided at one or more third frequencies, respectively, which typically are constant. As discussed later in detail, the types of feedbacks may notably comprise: (i) a structural relaxation, according to, e.g., physics governing the MPS; and (ii) a force feedback. Note that displaying (or rendering the system as it relaxes) can be regarded as another type of feedback, which indirectly makes use of the surrogate function, via the relaxation process.

The frequency used by the structural relaxation process may be the same as the "first frequency", i.e., the maximal frequency as used for updating configuration inputs, for reasons that will become apparent later. However, each of the third frequencies (as used for the feedback processes) is distinct from the second frequency, at which the rigorous computation of states is performed. The second frequency is indeed typically lower, e.g., much lower than the first and (at least one of the) third frequencies, on average, as exemplified below.

For instance, in the embodiment of FIG. 2, the step updating S20 the configurations of the MPS is performed at a first frequency (60 Hz, coinciding with the display refreshment frequency), while a state of the MPS is repeatedly computed S30, at a non-constant second frequency and all types of feedback are repeatedly provided S60, by sampling S22, S26 the configurations being updated S20. The structural relaxation process involved here samples S26 configurations at 60 Hz, while the force feedback process samples S22 configuration at 1 kHz. The surrogate functions are consistently evaluated at 60 Hz and 1 kHz, to provide the respective feedbacks. The second frequency is, on average, typically lower than 1 kHz. Note that, even if some of the frequencies coincide, the corresponding sampling and evaluation processes may remain distinct.

The duration of each of the repeatedly executed computations S30 may be inherently unpredictable, e.g., because of the method used for said computations S30. This is in particular the case when ab initio (iterative) quantum chemistry methods are used, for electronic structure calculations. In addition, calculation durations with such methods may well exceed a second, it being noted that a few hundred milliseconds would already prevent true interactivity. More generally, the reasons for unpredictable data availability may include:

Inherently unpredictable computation times, due to a computation method used;
Unpredictable user behavior exploration, which cannot be foreseen;
Varying dimensions of the MPS; or
Varying data availability, bandwidth, etc.

In variants, the duration of the calculations may be predictable, and even constant. Still, the time required may be incompatible with user-interactivity requirements, whence the advantage of a mediation solution as proposed herein, which involves a surrogate function.

Following the principle of the present methods, upon completion of a computation of a given state of the MPS, a next computation is started based on the last updated configuration of the MPS that is available. I.e., each state computation is started based on the latest configuration that is available before starting the computation, e.g., by requesting a latest configuration as stored in a dedicated data structure 30 (FIG. 3). This does not preclude parallelization; even if states computations are triggered in parallel, a next computation can inquire about the latest available configuration and take that configuration as input.

Typically, not all the updated configurations will be used for such computations. In fact, most of the real-time updated configurations will likely not be retained for the rigorous computations S30 of states, because of the typical and/or varying durations needed to complete the computations S30.

A surrogate function as obtained at step S50 temporarily approximates a true functions of the state of the MPS, until a current (or next) computation of state S30 completes, at which point a new surrogate function will be obtained S50, to approximate the next true function, and so on. Note that more than one surrogate functions may be obtained at each cycle S30-S50, if necessary, depending on the types of feedback desired.

In other words, the present solutions rely on a mediation, which acts as a temporal interface. The mediator can accommodate the fast configurational changes S20 and replaces the slow and/or intermittent state computations S30 to provide the desired response(s). The mediator can nevertheless be refreshed S50 upon completion of each computation S30, to maintain reasonable accuracy. As noted above, this mediator may involve one or more surrogate functions, e.g., a surrogate potential and/or forces derived therefrom, especially where energy minimization calculations are involved, as in chemical reactivity studies.

The true functions may reflect a computed state of the MPS, e.g., be a function of this computed state and/or of the configuration parameters of the configurations corresponding to such states. What the state of the system is depends on the physical context. In general, the state of the system is a set of quantities and/or parameters that determine an energy and/or the evolution of the system. In chemical reactivity studies as contemplated herein, the state of the system is essentially determined by a specific arrangement of atoms (i.e., the molecular structure). Other parameters (e.g., spin, charge, etc.) may intervene, especially in a "quantum context", which parameters impact the electronic structure and, in turn, also contribute to determine energies and forces.

Figure 4:
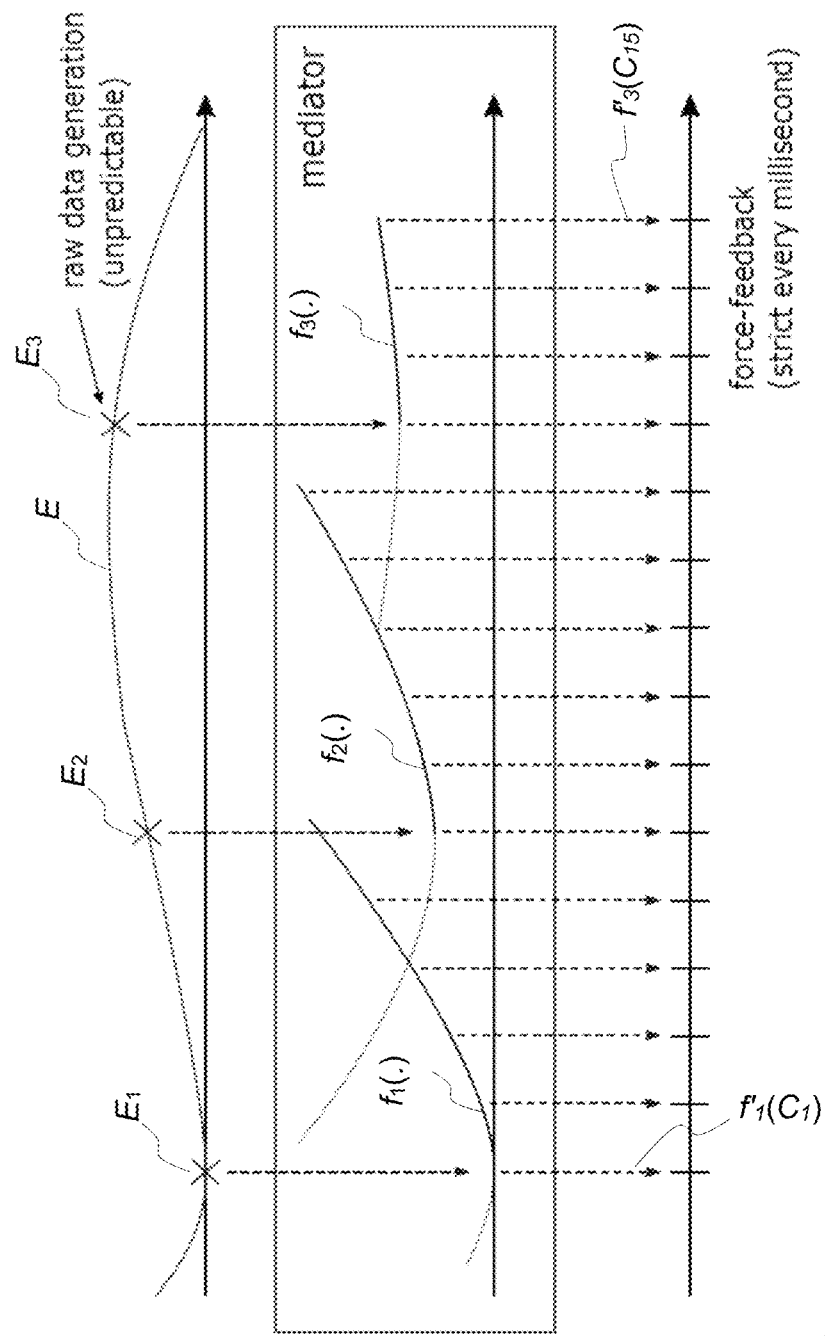
FIG. 4 is a pedagogical illustration of the (slow) computation of states of a system comprising a single degree of freedom (e.g., an interatomic distance in a diatomic molecule); and, in parallel, the (fast) constructions and evaluations of surrogate functions, allowing for a fast force feedback to be provided, following a mediation principle according to embodiments of the invention.
Figure 5:
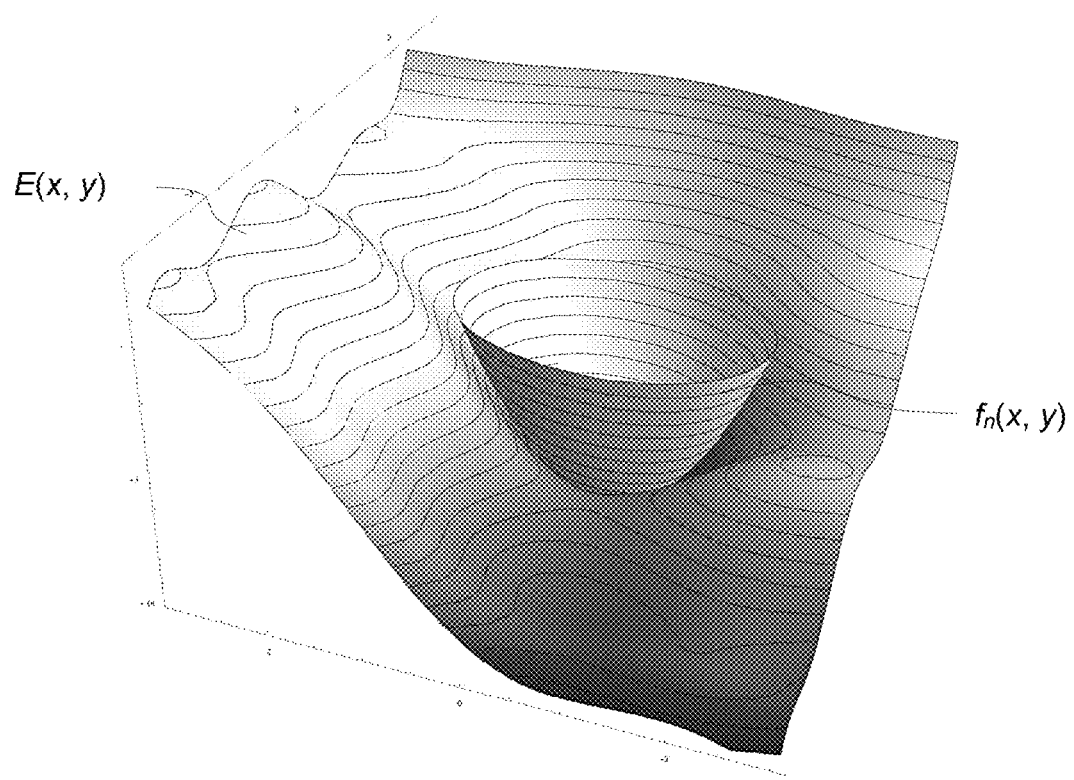
FIG. 5 shows a surface plot of a typical, exact potential energy surface E(x, y) of a molecule.
Figure 6:
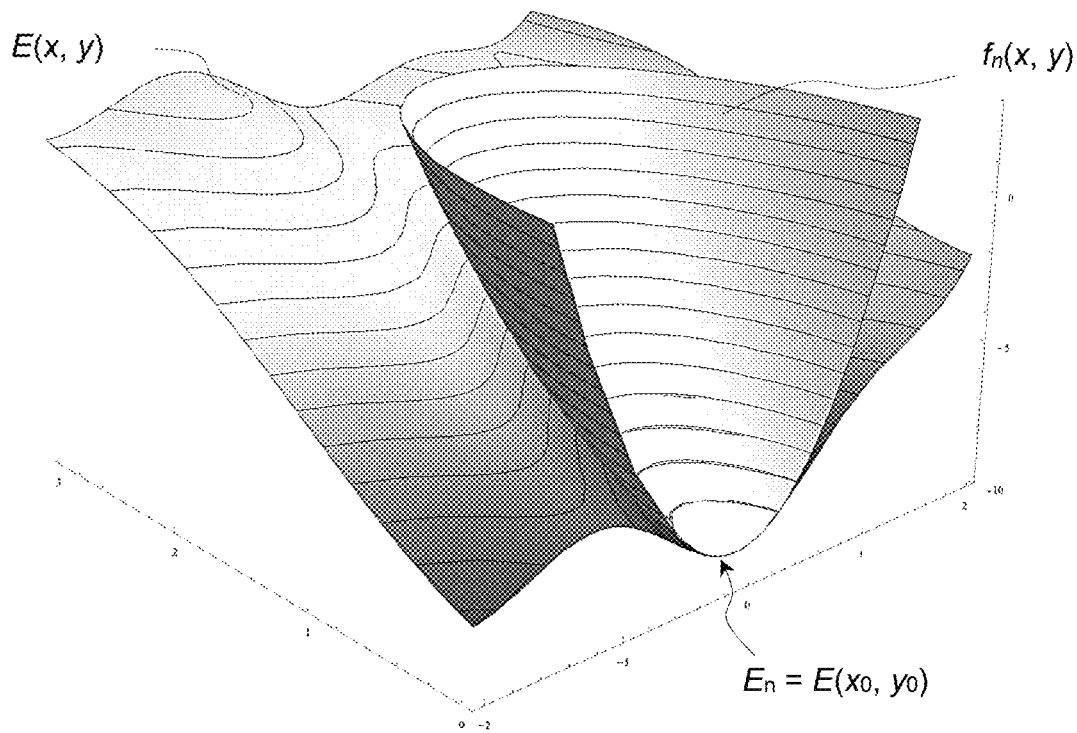
FIG. 6 is a close-up of FIG. 5.

The true function may for example be an electronic ground state energy of the MPS. A collection of several single-point energies (corresponding to distinct configurations) spans a so-called potential energy surface, i.e., describing the energy of a system, e.g., a collection of atoms, in terms of parameters such as the atoms' positions (or relative coordinates), as depicted in FIGS. 4, 5 and 6. The potential energy surface is the potential governing atomic motions under the Born-Oppenheimer assumption. FIGS. 5 and 6 show a typical potential energy surface $E(x, y)$ of a molecule for various configurations $C(x, y)$, which here assumes two degrees (x and y) of freedom. The example of FIG. 4 assumes only one degree of freedom (e.g., an interatomic distance), so that the resulting surface restricts to a curve. Of course, more realistic potential surfaces typically involve many more degrees of freedom. The configurations can be changed S20 as per user interactions S5 with and/or relaxation S10 of the molecule, which may each lead to modify atom positions (or, typically, their relative coordinates).

FIG. 5 also depicts a convex surrogate potential $f_n(.)$, i.e., a parabola in this example, that approximates the energy $E(x, y)$ close to a given point $(x_0, y_0)$ in the plane $(x, y)$. Said given point $(x_0, y_0)$ determines a particular state of the MPS, as obtained upon completing a $n^{th}$ computation S30 (let us call $C_n$ the corresponding configuration), which $n^{th}$ computation S30 is assumed to have led to energy $E_n = E(x_0, y_0)$ in this example (the point $(x_0, y_0)$ is conveniently chosen such that $(x_0, y_0) = (0, 0)$ in this example).

Remarkably, while the subsequent construction S50 of $f_n(.)$ depends on the particular configuration $C_n$ and the corresponding computation S30, $f_n(.)$ is a function that can be evaluated S62, S66 for any configuration (i.e., any pair of values $(x, y)$ in this example) as modified as per the configuration inputs S5, S10 received. In other words, the true function, e.g., $E_n = E(x_0, y_0)$, is a function of a given configuration $C_n = (x_0, y_0)$ of the MPS but the subsequently constructed S50 surrogate function $f_n$ is a simple function that may potentially take any configuration (or, more exactly, any parameters that determine such a configuration or a subset thereof), as argument. This subsequently enables fast evaluations S62, S66 of the surrogate function, as required for true interactivity. To that aim, the surrogate function (or a derivative thereof) is intrinsically designed so that it can be quickly evaluated, e.g., as a parabola or, more generally, as a continuously differentiable, strictly convex function, bounded from below.

As further seen in FIGS. 5, 6, the surrogate function $f_n(.)$ may not only approximate $E_n = E(x_0, y_0)$ in the vicinity (and in particular at the exact location) of $(x_0, y_0)$ but, more generally, it may be constructed so as to approximate the potential surface $E(x, y)$ in the vicinity of $(x_0, y_0)$, as explained below. Thus, the surrogate function will continue to provide a reasonable approximation to the true function during subsequent evaluations, as needed to provide feedback for the subsequently modified S20 configurations.

Note that the true function that the surrogate function approximates may not be explicitly required. Rather, the approximate surrogate function may be obtained from quantities or parameters obtained upon completion of the computation S30. In the case of electronic structure calculations, for example, the surrogate functions needed may be obtained from the first and second energy derivatives, where the derivatives are calculated directly from the molecular orbital coefficients, without explicitly involving the energy. Other techniques can, however, be used, see the next section. In more complex variants, one may need to first explicitly calculate S40 energies and then obtain first and second derivatives (as assumed in FIG. 2) therefrom, e.g., numerically, to fit a parabola. This, however, requests more complex calculations S30. In still other (less accurate) variants, previously stored functions (i.e., $E_{n-1}$, $E_{n-2}$, etc.) may be used, in addition to the latest function $E_n$ to construct the surrogate function, e.g., by fitting a convex function. In all cases, the resulting S50 surrogate function $f_n(.)$ may not only approximate a single-point function $E_n$ but, in addition, it may also provide a local approximation of a more general function like $E(x, y)$ in the example of FIGS. 5, 6, it being noted that said more general function can also be regarded as a function of different states of the MPS. Thus, the present solution generally assumes that a surrogate function $f_1(.), \ldots, f_n(.)$ can be obtained S50 upon completion of each computation S30, which surrogate function approximates a function of said each computed state.

Each type of feedback provided in embodiments is based (directly or not) on a last surrogate function constructed (and/or a function derived from it), which is quickly evaluated for each new configuration, a thing that is assumed to be not possible with the true functions, in a user-interactive context as assumed herein. In particular, a surrogate function is inherently designed so as to be evaluated at a frequency that is compatible with real-time user-interactivity requirements, e.g., at 10-100 Hz for the structural relaxation processes and visual feedbacks, and up to 1 kHz or even more for force-feedback processes. Suitable surrogate functions may for instance involve analytical functions (e.g., polynomials or a numeric function that is piecewise defined by polynomial functions), or still be numeric, provided it allows for fast computation including, e.g., derivation and/or integration, as needed for the desired feedback. Thus, and contrary to the computations S30, which may inherently not be performed for each updated S20 configuration of the MPS, the surrogate function (or a function obtained from it) can potentially be evaluated for each updated configuration, e.g., including configurations as constantly modified by the user inputs received S5. Still, the frequency of evaluations of the surrogate functions need not be strictly equal to the configuration update rate (S20).

The MPS may for instance be a polyatomic system, e.g., a molecule, as often assumed in the embodiments described below. Still, embodiments of the present invention may be applied to other physical systems involving potentials and derived forces, e.g., as in gravitational and electrostatic systems, or non-conservative force fields (e.g., friction in water, resistance of material due to different densities, magnetic fields, etc.).

More generally, various applications of the present approaches can be contemplated. In that respect, computing a state of the MPS should be broadly understood. This notably includes, e.g., calculating the states of the MPS, based on physics laws governing the MPS, as in the examples above. This, however, also includes loading or streaming data, which, once loaded, form a temporary state of the system, as occurring in virtual exploration when loading/streaming data related to a particular region explored by the user. In such a case, loading all the data required for virtual exploration may take too long to enable user-interactivity, whence the interest of a mediator as proposed herein. Potential applications of the present methods are discussed in sect. 2.1.

Referring now more particularly to FIGS. 1 and 4-6, in embodiments, the underlying MPS is a polyatomic system of atoms or ions interacting with each other. The electronic configuration of the MPS depends notably on its geometrical structure (i.e., the relative positions of the atoms/ions). In such a case, the configuration inputs received S20 comprise structural inputs to modify a geometrical structure of the polyatomic system, as depicted in FIG. 1. In addition, each of the computations S30 comprises an iterative electronic structure calculation, which is started based on a latest updated configuration of the polyatomic system as was available before starting the calculation, following the principles already described above.

As assumed in FIG. 2, upon completion of each calculation S30, a single-point energy $E_1, \ldots, E_n$ may be obtained S40, as well as one or more energy derivatives, if necessary. The surrogate potential can then easily be constructed S50 from the energy (and derivatives thereof, if necessary). However, and as noted earlier, it may be simpler to construct S50 the surrogate potentials directly based on the wave function as obtained upon completion of the calculation S30, e.g., based on coefficients of the molecular orbitals or the reduced density matrix, in which case no explicit use is made of the energy. In all cases, the surrogate potentials $f_1(.), \ldots, f_n(.)$ subsequently obtained approximate energies $E_1, \ldots, E_n$ and may possibly constitute, each, a local approximation of the potential energy surface, as explained above.

The polyatomic system is typically a molecule. The user is typically led to interactively modify a molecular electronic configuration, e.g., starting with the geometrical structure of the molecule. As described earlier, a preferred implementation is one where the user modifies the molecular structure via a mouse or a haptic device, which triggers successive calculations of ground states (calculating electronic states other than the ground state is much more time consuming).

The system may also be a polyatomic ion, a cluster or a bulk system, e.g., a crystal, being locally modified by the user.

The feedback provided may include a dynamic relaxation S66 of the molecular system, which is easily evaluated based on the surrogate potential, as discussed below. The feedback may also include a force feedback, provided via a haptic force feedback device 22, and mimicking a force as experienced by an atom being selected (and possibly moved, e.g., dragged) by the user, e.g., via a mouse or the haptic force feedback device 22 itself. Many other types of feedbacks can be contemplated, such as: a force field, an electron and/or momentum density of the system, a Compton profile, a structure factor, an X-ray spectrum, etc., or more generally, any electronic property of the MPS. Each type of feedback may be visually, graphically and/or numerically provided, dynamically, as the user interactively modifies the configuration of the system.

FIG. 4 illustrates a computation of states of a system comprising a single degree of freedom, as is for instance the case in a diatomic molecule. The (slow) computation S30 of states is performed intermittently, leading to the successive estimations of energies $E_1$, $E_2$ and $E_3$. Upon completion of each computation S30, a corresponding surrogate potential $f_1(.), f_2(.)$ and $f_3(.)$ is obtained S50. Each surrogate potential $f_1(.), f_2(.)$ and $f_3(.)$ approximates the energies $E_1$, $E_2$ and $E_3$, respectively. In fact, it can be realized that the surrogate potential $f_n(.)$ locally approximates the energy curve E in the vicinity of the particular points $E_1$, $E_2$ and $E_3$. While we may very well have an exact relationship at the particular points $E_1$, $E_2$ and $E_3$, such that $f_n(C_n)=E_n$, a strict equality is however not necessarily needed. In particular, one may want to impose particular constraints on the surrogate potentials $f_n(.)$, which constraints may result in that $f_n(C_n) \approx E_n$. Still, the (fast) constructions and evaluations of the surrogate functions for each intermediate configuration $C_m$ allows a fast feedback to be provided. In particular, and as illustrated in FIG. 4, a force feedback can be provided, at a high frequency, using a derivative of the surrogate functions, e.g., by evaluating $f_n'(C_m)$, for each m.

The feedback processes are now discussed in more detail. Referring to FIGS. 2, 3, in embodiments, step S60 comprises providing a first type of feedback, whereby a dynamic relaxation of the MPS is computed S66. The dynamic relaxation is computed based on: (i) a last surrogate function as obtained at step S50; and (ii) the last updated S20 configuration that was available before starting to compute the dynamic relaxation. The computed S66 dynamic relaxation causes to change S10 a configuration of the MPS as it relaxes. The changed configurations are, in turn, processed as configuration inputs, together with the user inputs received S5, when updating S20 the configurations of the MPS.

For example, a dynamic relaxation of a polyatomic configuration may be computed S66, based on a last known polyatomic structure configuration, such that the polyatomic configuration is at least partly modified S10, S20 as it relaxes S66. The relaxation can easily and quickly be computed by minimizing a last surrogate potential obtained. For example, a steepest-descent algorithm may be used, as known per se. Other algorithms are known.

In the embodiments of FIGS. 2, 3 and 7, the UIS 20 includes a display 26. The configurations of the MPS, which are modified as per the computed S66 dynamic relaxation and the received S5 user inputs can thus be dynamically displayed (or rendered) S70 on the display 26. In the embodiments of FIG. 2, the dynamical relaxation process S66 involves sampling S26 the configurations (that are otherwise concurrently updated at step S20) at a frequency that is equal to the frequency at which the configurations of the MPS are displayed S70, e.g., at 60 Hz. Similarly, the evaluation S66 may comprise checking for a last surrogate function obtained at that same frequency. That is, the "first" frequency (configuration updates) may be equal to the relaxation feedback frequency, which can further be chosen to be equal to the frequency at which the display is refreshed.

Indeed, it can be realized that there may not be a strict need for sampling configuration changes faster than the refresh rate (at least for display purposes). On the other hand, it is not necessarily needed to relax the system faster than what is displayed to the user. Thus, the configurations used for the relaxation and for displaying may be sampled at a same frequency. Even, that same frequency may be equal to the frequency at which the user inputs are sampled and the configurations updated S20. Thus, a last surrogate function available may be invoked S56 and evaluated S66 at a same frequency (e.g., both at 60 Hz) as used for sampling S26 the latest configurations, i.e., at a same frequency as typically used for refreshing a display.

However, one may want, in variants, to update S20 the configuration inputs at a higher frequency (e.g., larger than 60 Hz), notably to be able to start new computations S30 based on the latest possible configuration inputs.

Synchronization issues and conflicts may potentially arise from the various configuration inputs received S5, S10 (which may comprise both the user inputs S5 and changes S10 due to the computed S66 dynamic relaxation). Such issues may further hamper the feedback to the user. To prevent such issues and provide a relevant feedback to the user, one may restrict the dynamical relaxation to parts that are not directly concerned by the user inputs. Namely, where the MPS is a system comprising multiple, interacting components, and the user inputs received S5 are restricted to a first subset of the interacting components, the dynamic relaxation may be restricted to a second subset of the interacting components that is distinct from said first subset. For example, the user may select an atom or a group of atoms, in which case the relaxation is automatically restricted to remaining atoms of the MPS. Advantageously, a force feedback may still be provided, which accounts for the force experienced by the selected atom or atoms. This way, one reconciles two sources of modification of the MPS configurations, while maintain concurrent feedback processes S62, S66, and in a way that is still physically meaningful to the user.

In variants, potential conflicts due to competing inputs S5, S10 may be alleviated by tuning and/or increasing the various rates, such as involved at steps S5, S10, S22 and/or S26. For example, one may increase the writing rate S5 with respect to the writing rate S10, or increase the rates involved at each of the steps S5, S10 and S26.

In that respect, and referring now to FIGS. 2-4 and 7 the UIS 20 may, in embodiments, comprise a force feedback device 22. The user inputs may advantageously be received S5, at least partly, via the same force feedback device 22 as used to provide force feedback to the user. Thanks to the device 22, the user may notably select a component of the MPS and, e.g., move or drag the selected component to modify a configuration of the MPS. For example, the user may select and move an atom or an ion (or a group thereof). A second type of feedback may accordingly be provided via the force feedback device 22, as to a force experienced by the selected component. This can be achieved by sampling S22 the configurations (which are otherwise concurrently updated S20) and by evaluating S62 a surrogate function, following the same principles as described above. If the primary surrogate function obtained at step S50 is a potential, then the force feedback process needs to evaluate a gradient of this potential, that is, a function that is obtained S52 from a last surrogate function as constructed at step S50 according to the sampled S22 configurations. Deriving a force from a potential is known per se. The force is evaluated at a fourth frequency, compatible with the force feedback device. Note, however, that the parameters determining the surrogate functions are likely obtained at step S50, which parameters may for instance be polynomial coefficients. And these parameters equally determine the surrogate potential or the surrogate force, such that there is no need to explicitly derive the force from the potential in that case. In variants, e.g., where numerical functions are used, a force may need to be explicitly computed (a numerical gradient) from the potential.

Advantageously, a conservative feedback mechanism may be provided, which constrains the surrogate function to be a continuously differentiable, strictly convex function, and bounded from below, as illustrated in FIGS. 4-6. As it can be realized, this will prompt the user to stay in a "safe" area, close to a minimum of the convex function, i.e., a configuration for which the surrogate function is accurate, if not exact. In addition, using such a function ensures a smooth derivative, which is useful when a derivative of the surrogate function is needed by the force feedback process, as assumed in the embodiments of FIGS. 4-6. For example, a quadratic potential (parabola) gives rise to a linear force (continuously defined). This, in turn, prevents the force-feedback device to provoke disagreeable or even painful feedback. For completeness, a continuously differentiable, strictly convex function (bounded from below), or a derivative thereof, acts as a smooth shutdown mechanism (the force linearly increases) for the force feedback device. More generally, a $l^{th}$ differentiable function may be used, where l depends on the derivatives needed for the feedback process.

Most practically, each surrogate function $f_1, \ldots, f_n$, obtained S50 upon completion of each computation S30 may be constrained to be a parabola. This way, the surrogate function and the force derived from it constantly prompt the user to bring a selected component back to the minimal value of the potential, i.e., in a region where the surrogate function is, in principle, accurate, and possibly exact. In addition, a parabola ensures a linear force feedback, as noted above.

In embodiments, two types of feedback are concurrently provided, e.g., a dynamical relaxation S66 and a force feedback S62, which respectively involve a third and a fourth frequencies. As noted earlier, the third frequency is preferably equal to the first frequency (at which configurations are updated S20) and is typically in a range between 10 and 100 Hz, e.g., 30 Hz or 60 Hz. It preferably coincides with a refresh rate for the display 26. The fourth frequency used for the force feedback is typically between 0.1 and 10.0 kHz. Typical force feedback devices use a frequency of 1 kHz.

The above embodiments have been succinctly described in reference to the accompanying drawings and may accommodate a number of variants. Several combinations of the above features may be contemplated. Examples are given below and in the next section.

In preferred embodiments such as depicted in FIGS. 1-6, the MPS is a polyatomic system, e.g., a molecule. The configuration inputs received S5, S10 comprise structural inputs to modify S20 a geometrical structure of the polyatomic system. Two sources of inputs are merged at step S20: (i) inputs S5 arising from the user (and received via a force feedback device 22 and/or a mouse 27); and structural modifications concurrently arising from a relaxation process S66, which is restricted to components of the MPS that are not currently manipulated by the user. All configuration inputs are sampled and updated S20 at a same frequency, which coincides with a refresh rate frequency of the display.

The configuration updates (e.g., as stored in the data structure 30) are sampled, in turn, by four mechanisms: (i) the state computation S30 (intermittently, at an unpredictable rate), which requires S25 a latest configuration as available before starting; (ii) the force feedback device, which samples S22 the latest configurations available (at 1 kHz) for subsequent evaluations (at 1 kHz) of the last surrogate forces obtained at step S50; (iii) the relaxation mechanism, which samples S26 the latest configurations available (at 60 Hz) for subsequent evaluations (at 60 Hz) of the last surrogate potentials available; and (iv) the display itself, which samples S27 last configurations available at 60 Hz.

Each of the computations S30 involves an iterative electronic structure calculation, invoking an ab initio quantum chemistry method, e.g., using Hartree-Fock or post Hartree-Fock methods, multi-reference methods or, more generally, a wave function-based method. Density functional theory (DFT) methods can be used as well. The duration of such calculations is unpredictable in the present context. Each calculation S30 is started based on a latest updated S20 configuration as was available before starting the calculation.

Outcomes of the calculations S30 allow S35 to obtain S40: a single-point energy $E_n$ corresponding to a latest (the $n^{th}$) updated configuration, coefficients of the molecular orbitals, etc. If necessary, energy derivatives are calculated S40 as well. All the necessary outcomes are obtained at step S40, which are, in turn, used S45 to construct S50 a surrogate potential $f_n(.)$ approximating the computed energy $E_n$. The latter is a parabola, whose coefficients are preferably obtained from the coefficients of the molecular orbitals through the first and second energy derivatives, see sect. 2, so as for the surrogate potential $f_n(.)$ to locally approximate the potential energy surface. The coefficients of the parabola allow a force (otherwise derivable from this potential) to be readily evaluated as well. As seen in FIG. 1, the calculations S30 do not enable real-time user-interactivity, because they are either too long and/or of unpredictable duration; the kind of feedback (third row) they allow is, as such, prior art. On the contrary, a surrogate function as obtained at step S50 can be evaluated S60 at a frequency that is, this time, compatible with real-time user-interactivity requirements. To that aim, latest configurations are sampled S22, S26 at moderately high (60 Hz) to high (1 kHz) frequency and the surrogate functions are evaluated S62, S66, at respective frequencies (60 Hz and 1 kHz), using parameters of the sampled S22, S26 configurations as arguments. Two direct feedback processes are involved: one involving a dynamical relaxation S66 of the MPS, the other one involving S62 the force feedback device 22. Dynamically modified configurations are displayed S70 (or rendered) by sampling S27 the configurations as updated and stored in the data structure 30.

2. Specific Embodiments, Applications and Technical Implementation Details 2.1 Potential Applications Beyond electronic structure calculations, the MPS may, more generally, be a system comprising multiple, interacting components. The surrogate functions $f_1, \ldots, f_n$ constructed may be surrogate potential energies, which impact the interacting components, according to the MPS. For example, the components may be atoms (as discussed in the previous section) or, more generally, interacting charges (electrostatic), interacting bodies (gravitational), or mechanically interacting bodies or parts (e.g., a chain of connected links). These components may for instance be parts of a computer-aided design (CAD) systems or a computer-aided manufacturing (CAM) system that interact according to a MPS assumed in the CAD/CAM system.

The computation S30 will typically include a calculation of a state of the MPS. However, in variants, the computation S30 may essentially consist in loading or streaming a state of the system that is constantly modified as per the user interactions (and possibly other real-time feedbacks).

Thus, embodiments may concern cases where a configuration is loaded, e.g., step by step, even if no calculation of state is specifically done, as may occur e.g., for CAD/CAM systems or in virtual exploration. As loading or streaming data pertaining to a temporary state may take too long to enable user-interactivity, a mediation solution as proposed herein may advantageously be relied upon. Potential applications may therefore concern:

2.1.1 Electronic Structure Calculations for Reactivity Explorations, as Discussed in More Detail in Sect. 2.2 Below;

2.1.2 More generally, simulations in physics, chemistry, electronics, engineering, etc., that can benefit from user-driven inputs, based on real-time feedback. On-the-fly parameter changes by the user may notably be beneficial in such fields as astrophysics or fluid dynamics;

2.1.3 CAD/CAM systems, for the design of parts or assemblies of parts. In CAD and CAM systems, a user may be led to virtually browse or navigate parts or products linked by way of relations such as, e.g., "is composed of", "in contact with", etc. In such systems, the CAD parts may be subject to a simulation, within the CAD model loaded in the CAD system.

2.1.4 In teleoperation scenarios, remote control of objects may be needed, with real-time feedback. Feedback can there be based on sensor data that, for some reason, might not always be available. For safety reasons a remote control is usually frozen in such situations. However, using a conservative feedback mechanism as described in the previous section (where a surrogate function is bound from below) may nevertheless keep the user in a safe area, such that an immersion of the operator (user) is not impaired. Instead, the operator is driven to operate in safe regions by the feedback mechanism. Examples of fields potentially concerned are: surgery (for virtual training purposes), remote operation of drones, unmanned submarines, vehicles, drillers, etc.

In the case of remote control of drillers (to reach oil reserves), if sensor data do not arrive in time, a feedback may be generated so as to prevent the operator to cause damages.

In the case of surgery (virtual training), a haptic device may represent a scalpel, a driller or a bone saw. A resistance provided by the haptic device may be based on: on-the-fly measurements and/or calculations pertaining to human tissue. Data may be loaded on-the-fly, but the data availability may depend on the explored region.

When simulating the drilling of a tunnel: the resistance provided by the haptic device may depend on a material, its density, etc.

In many of the above examples, data availability may vary and so the provision of resistance information is unpredictable.

2.2 Applications to Electronic Structure Calculations

Any reasonable electronic structure method that is able to generate reliable results requires an iterative optimization procedure. The iterative nature of these methods, however, leads to unpredictable execution times. Assuming that all calculation parameters are fixed and only the molecular structure varies from calculation to calculation, as is the case in explorations of chemical reactivity, it is not determined whether and when a calculation will converge. This also holds for methods that usually converge in a few iterations and that have short execution times per iteration. A user exploring the reactivity of the system may generate structures far from equilibrium that lead to many or even indefinite iterations.

The execution time of the electronic structure calculations introduces time shifts between the molecular structures retained for rigorous calculations. A feedback is thus always given with a certain delay comprising, on the one hand, the shift resulting from the execution time of the electronic structure optimization and, on the other hand, the time elapsed between the completion of the last electronic structure optimization and the time point at which the feedback is needed.

This is represented schematically in FIG. 1, where the top row depicts (symbolically) a real-time evolution of a molecular structure as displayed to the user, when the latter interacts with the molecular structure, e.g., by way of a suited graphical user interface. As depicted in the second row, electronic structure calculations may only be performed for selected structures, because of limitations inherent to the calculations.

Thus, a feedback as enabled by know prior art methods (direct or indirect, third row of FIG. 1) relies on molecular structures for which the calculations have completed. Such a feedback is incompatible with true interactivity. Assuming an automated method, the vertical dashed lines in FIG. 1 represent time points at which an electronic structure calculation has completed and another one starts.

The delay may not be perceptible if the electronic structure calculations are very fast. However, they clearly lead to artifacts in the user perception as soon as execution times increase or are of unpredictable duration. In FIG. 1, it is assumed that a new electronic structure calculation starts only when a previous calculation has completed. Accordingly, a feedback such as provided with prior art methods can only be based on a same molecular structure for the duration of the next electronic structure calculation.

It would be possible to reduce the delay by launching parallel calculations for consecutive structures, which will increase the update frequency of the properties needed for the feedback. Even then, however, the delay will not sufficiently vanish because of the shift caused by the electronic structure optimizations. The inherently unpredictable execution times and the finite delays even in the most well behaved situations prohibit the direct application of electronic structure calculation as a data source for real-time feedback as required in interactive applications.

Solutions to that problem have been disclosed in the previous section. For instance, in a setting that allows a user to interact with virtual objects, the response of the system to the user's actions is presented by a feedback component 22. This feedback component is usually fed with data by some data generation component (usually some sort of calculation). Providing real-time feedback imposes strict deadlines for the data availability. Thus, the data flow from the data generation to the feedback component 22 can only be direct. I.e., the data generation needs be performed at predictable and constant time intervals.

As the data generation, however, cannot guarantee the provision of new data at fixed time intervals in the context assumed herein, an additional component is provided to mediate between the unpredictable data output stream S30 and the strict real-time requirements imposed by the feedback device 22. The mediator S50 consumes the data stream S30-S45 coming from the generating calculations S30 and uses it to provide real-time data for the user feedback. For a flawless and smooth user experience, the studied subject should preferably never freeze or show an unreasonable response (which would allow the user to explore areas of the system that would otherwise be prevented by the true response, had the latter been available).

Thus, the mediator preferably fulfills three requirements:
(i) It guarantees to deliver data for the feedback at given time intervals (specified by the addressed sense);
(ii) It provides a physically reasonable feedback; and
(iii) The output data are based on the most current data available.

The mediator may rely on the ability of the data generation process to provide a time ordering of the data stream. According to the scheme described in sect. 1, the time order is automatically achieved if the data generator performs the calculations consecutively. In case of parallel calculations, the data generation may provide additional timing information as to which results belong to which point in time.

A trivial implementation would be to just provide the last received data to the user feedback component until it receives new data from the generator. However, as the last data may no longer correspond to the situation the user is experiencing, interactivity may be hampered or lost.

Therefore, an implementation fulfilling the three requirements stated above is achieved by employing a surrogate potential, as described earlier. The surrogate potential replaces the real potential, which is nonetheless updated at unpredictable time intervals, for generating the data fed to the user feedback component. Instead of obtaining (sampling) the real-time feedback data from the real potential, the surrogate potential is evaluated S62, S66. The time to sample (evaluate) the surrogate potential has to be predictable and fast, whence the preferred usage of analytical potentials. To always represent the latest data available, the surrogate potential is replaced S35-S50 by a new one each time a new computation completes S30.

An exemplary case is depicted in FIG. 4, where the potential is an energy E and the real-time feedback is the force calculated from the negative gradient of the energy. FIG. 3. The real potential E is used (upper dashed arrows) to generate the surrogate potentials $f_1, f_2$ and $f_3$ (parabolas), which are in turn sampled (lower dashed arrows) to provide the real-time feedback data $f_n'(C_m)$. Unused parts of the surrogate potentials due to the arrival of new data are shown in lighter gray.

Note that it is unimportant here how the new calculations are started S30 as long as the results S40 are strictly ordered in time. The mediator used to evaluate the surrogate potentials just needs to know which are the most current data. The calculations can thus be performed consecutively (a new calculation starts only when the previous stopped) or in parallel (the calculations can overlap).

The requirement on the mediator to always yield reasonable data that prevents the user to explore unreasonable areas may be achieved by using a surrogate potential that is always bound from below. The user feedback sampled from such surrogate potentials always brings the user back to the regions where the potential reasonably approximates the real potential. The forces can be rendered as a direct feedback by haptic devices and also indirectly by using them to optimize the system (e.g., energy minimization or propagation in time). The bound nature of the potential ensures that if the user moves away from the point for which the latest data was calculated, the rendered forces point back to a safe region. Any possibly running optimizations receive forces that keep the whole system together.

An unbound surrogate potential may, on the contrary, lead to unphysical forces and thus unphysical system configurations. It has to be noted that a bounded surrogate potential is not a mere interpolation scheme as it uses only local information from the latest calculation to predict the true potential until new data arrives. On the contrary, an interpolation of the accumulated exploration history may not improve the prediction as the user's manipulations may lead to explore new areas that cannot be foreseen. A convex, bounded potential may nevertheless be inferred from historical data (which differs from a mere interpolation).

For real-time quantum chemistry, approximating the correct but unknown potential by surrogate potentials of quadratic form allows for an efficient calculation of the forces needed for the structure adaptation (relaxation feedback S66) and for the haptic force rendering S62. Quadratic potentials are perhaps the simplest possible form that can be used for the surrogate potentials. In variants, higher-order polynomials may be sued. Other variants may involve a Gaussian approximation, e.g., a Gaussian renormalization of a quadratic potential, etc.

Quadratic potentials are characterized by the general expression:

$$V_{sur}(x) = V_0 + a^T(x - x_0) + \frac{1}{2}(x - x_0)^T B(x - x_0) \quad (1)$$

where $x=\{x_1, \ldots x_m\}$ is a coordinate vector for the atomic positions, $x_0$ a reference position, $V_0$ a constant potential shift, a a m-dimensional vector and B a m×m matrix.

FIGS. 5 and 6 illustrates a quadratic approximation of a given potential in a two-dimensional space (m=2). Quadratic potentials allow for an analytic evaluation of the forces:

$$F_{sur}(x) = -\nabla V_{sur}(x) = -a - B(x - x_0) \quad (2)$$

$F_{sur}$ is a vector composed of atomic forces and provides a basis for real-time feedback. In order to reproduce the correct potentials around the atomic positions as accurately as possible, a and B may be derived S40 from the derivatives of the electronic energy with respect to the atomic positions. That is, the surrogate potential may be chosen to fit the local curvature of the potential around the atomic nuclei. Given a molecular structure for which the electronic structure is known, the coefficients of the surrogate potential around $x_0$ are derived from the electronic energy E and its derivatives as:

$$V_0 = E(x_0) \quad (3)$$

$$a_i = \partial E(x_0)/\partial x_i \quad (4)$$

$$B_{ij} = \partial^2 E(x_0)/\partial x_i \partial x_j \quad (5)$$

In this way, the surrogate potential features the correct potential as well as correct first and second derivatives at the position $x_0$. However, such a procedure does not prevent generating quadratic potentials featuring maxima or saddle points, in which case the potential would not satisfy the requirement to be bound from below.

It is possible to enforce the generation of bound quadratic potential at the cost of losing some curvature information at the reference point. Surrogate potentials having maxima or saddle points are characterized by B not being positive-definite, i.e. B has one or several negative eigenvalues. A procedure that can advantageously be adopted to generate bound potentials in such cases is to generate a positive-definite matrix by replacing negative eigenvalues by their opposites. Namely, one may first calculate the eigenvalues $e_i$ of matrix B, then calculate $e_i' = abs(e_i)$ and finally back-transform the result to a new matrix B' based on the sole positive eigenvalues $e_i'$.

For a molecular system consisting of N atoms, one may notably generate surrogate potentials in the two following ways. First, one may approximate the correct potential by a single surrogate potential in m=3N dimensions. In this case, B is the Hessian matrix and the potential is quadratic in deviations in the eigen modes. Second, the correct potential can be approximated by a combination of N quadratic potentials in m=3 dimensions, each depending on one atomic position.

The second alternative is computationally more efficient as it involves the calculation of 6N second derivatives instead of (3N)(3N+1)/2 terms and does not require the diagonalization of a 3N×3N matrix.

Both approaches can be applied in real-time quantum chemistry. For the haptic force rendering, a quadratic potential of dimension m=3 allows for a faster evaluation, as it depends on the coordinates of the manipulated atom only. As a result, a force feedback of 1 kHz or more can be obtained. Using a quadratic potential of dimension m=3 accordingly results in a much better responsiveness upon manipulation. Thus, preferred embodiments use a quadratic potential of dimension m=3, which can be obtained upon completion of a last calculation S30.

The surrogate potentials also provide all necessary forces for the structural response (steepest-descent relaxation). Now, if only the first derivatives of the potential energy are used for the relaxation, atoms could easily move too far during the time the electronic structure optimization needs to converge. Upon structural changes, the surrogate potentials provide better forces because of the potential curvature information and, furthermore, limit the global motion of atoms until the next electronic structure calculation converges since the quadratic potentials can be constrained to feature one single minimum (bounded potentials).

The implementation of surrogate potentials in real-time is represented schematically in FIGS. 2 and 3. Three independent loops run constantly. In the first one (S5/S10-S20-S30), consecutive electronic structure calculations (of unpredictable execution time) are performed continuously. The latest available (i.e., the most current) molecular structure is fetched S25 before starting the substantial computation S30. A new calculation S30 starts and the surrogate potentials can be subsequently obtained (i.e., constructed) S35-S50, e.g., from the energy and its derivatives upon completion of step S30. The second loop (S10-S20-S66) runs at 60 Hz and is responsible for the structural relaxation of the system based on the steepest-descent algorithm. The third loop (S5-S20-S62) runs up to 1 kHz. It registers the user manipulation (at 60 Hz) and gives a force feedback through S62a the haptic device, which involves sampling S22 latest configurations and evaluating S66 a last surrogate force at 1 kHz.

A particularly satisfactory implementation uses mediators in the form of anisotropic harmonic potentials, which are obtained in a real-time quantum chemistry framework in association with wave function-based methods based on the Hartree-Fock formalism. Surrogate potentials were generated for each of the atomic nuclei from the computed energies, analytical first derivatives and frozen-density second derivatives. Using frozen-density second derivatives allows bypassing the calculation of exact analytical second derivatives, which bypasses the resolution of coupled perturbed Hartree-Fock equations, which are computationally much more expensive than the calculation of the mere gradients in a simple Hartree-Fock procedure.

2.3 Computerized Systems and Computer Program Products

Computerized devices can be suitably designed for implementing embodiments of the present invention. It can be appreciated that the methods described herein are essentially non-interactive, i.e., automated. Such methods can be implemented in software, hardware, or a combination thereof. In exemplary embodiments, the methods described herein are partly implemented in software, e.g., as an executable program (such as an application program), the latter executed by suitable digital processing devices.

For instance, a suitable computerized system 100 may include one or more processing elements such as a processor or CPU 105 (FIG. 7) and a memory 110 coupled to a memory controller 115. The CPU 105 is a hardware device for executing software, as e.g., loaded in a main memory of the device. The processors involved may comprise any custom made or commercially available processor.

The memory 110 typically includes a combination of volatile memory elements (e.g., random access memory) and nonvolatile memory elements, e.g., solid-state devices. The software in memory may include one or more separate programs, each of which comprises an ordered listing of executable instructions for implementing logical functions. In the example of FIG. 7, the software in the memory 110 includes methods described herein in accordance with exemplary embodiments and a suitable operating system (OS). The OS essentially controls the execution of other computer (application) programs and provides scheduling, I/O control, file, data and memory management, communication control as well as related services.

In exemplary embodiments, and in terms of hardware architecture, the system 100 may further include one or more input and/or output (I/O) devices 22, 26, 27 (or peripherals) communicatively coupled via a local input/output controller 135. The input/output controller 135 can comprise or connect to one or more buses or other wired or wireless connections (not shown). The input/output controller 135 may have additional elements, which are omitted for simplicity, such as controllers, buffers (caches), drivers, and receivers, etc., to enable communications. Further, local interfaces may be provided which may include address, control, and/or data connections to enable appropriate communications among the aforementioned components.

Possibly, a conventional keyboard and mouse 27 can be coupled to the input/output controller 135. Other I/O devices 22 such as a force feedback device may include hardware devices, i.e., I/O devices that communicate both inputs and outputs. The system 100 may further include a display controller 126 coupled to a display 26, for visual feedbacks. In exemplary embodiments, the system 100 may further include a network interface or transceiver for coupling to a network (not shown). Part of the computation required may be delocalized for execution as a server.

The methods described herein shall typically be in the form of executable program, script, or, more generally, any form of executable instructions.

In operation, one or more of the processing elements 105 execute software stored within the memory 110 (separate memory elements may possibly be dedicated to each processing element), to communicate data to and from the memory 110, and to generally control operations pursuant to software instruction. The memory further stores executable computerized methods for the data generation/computational part S20-S50, as well as a data structure 30 storing the latest MPS configurations and constructed surrogate functions. The methods described herein are read in whole or in part by one or more of the processing elements 105, typically buffered therein, and then executed. When the methods described herein are implemented in software, the methods can be stored on any computer readable medium for use by or in connection with any computer related system or method.

Computer readable program instructions described herein can be downloaded to processing elements 105 from a computer readable storage medium, via a network, for example, the Internet and/or a wireless network. A network adapter card or network interface in the device may receive the computer readable program instructions from the network and forwards the program instructions for storage in a computer readable storage medium 120 interfaced with the processing elements.

Aspects of the present invention are described herein notably with reference to a flowchart and a block diagram. It will be understood that each block, or combinations of blocks, of the flowchart and the block diagram can be implemented by computer readable program instructions.

These computer readable program instructions may be provided to one or more processing elements as described above, to produce a machine, such that the instructions, which execute via the one or more processing elements create means for implementing the functions or acts specified in the block or blocks of the flowchart and the block diagram. These computer readable program instructions may also be stored in a computer readable storage medium.

The flowchart and the block diagram in the accompanying drawings illustrate the architecture, functionality, and operation of possible implementations of the system 100, methods of operating it, and computer program products according to various embodiments of the present invention. Note that each block in the flowchart or the block diagram may represent a module, or a portion of instructions, which comprises executable instructions for implementing the functions or acts specified therein. In variants, the functions or acts mentioned in the blocks may occur out of the order specified in the figures. For example, two blocks shown in succession may actually be executed in parallel, concurrently or still in a reverse order, depending on the functions involved and the algorithm optimization retained. It is also reminded that each block and combinations thereof can be adequately distributed among special purpose hardware components.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention will not be limited to the particular embodiments disclosed, but that the present invention will include all embodiments falling within the scope of the appended claims. In addition, many other variants than explicitly touched above can be contemplated. For example, other quantum chemistry methods than those explicitly evoked above may be relied upon.

The invention claimed is:

1. A computerized method for providing real-time feedback to a user from states of a model physical system, or MPS, via a computerized system comprising one or more processors and a user interface system, or UIS, the method comprising steps, each performed via the one or more processors, the steps including:
   repeatedly receiving configuration inputs to modify a configuration of the MPS, said inputs including user inputs received via said UIS; and
   while receiving said configuration inputs:
   updating configurations of the MPS based on the configuration inputs received; and
   repeatedly, computing a state of the NIPS, whereby each computed state corresponds to a latest updated configuration that was available before starting to compute said each computed state, and
   while repeatedly computing a state of the MPS:
   obtaining, upon completion of each computation: a surrogate function approximating a function of said each computed state; and
   repeatedly providing via the UIS at least one type of feedback in respect to said user inputs received; by
   sampling the configurations being updated; and
   evaluating a last surrogate function obtained, and/or a function derived from the last surrogate function obtained, according to the sampled configurations, at a frequency compatible with real-time user-interactivity.

2. The computerized method according to claim 1, wherein
   updating the configurations of the NIPS is performed at one or more first frequencies;
   a state of the MPS is repeatedly computed, at a second frequency; and
   said at least one type of feedback is repeatedly provided, by sampling the configurations at at least one third frequency, respectively, wherein said second frequency is, on average, lower than at least one of the at least one third frequency.

3. The computerized method according to claim 2, wherein:
the MPS is a system comprising multiple, interacting components;
the surrogate function is a surrogate potential energy impacting the interacting components, according to the MPS,
and wherein,
repeatedly computing a state of the MPS comprises repeatedly executing calculations of a state of the MPS, each of the calculations being started based on said latest updated configuration.

4. The computerized method according to claim 3, wherein:
the MPS is a polyatomic system of atoms or ions interacting with each other, an electronic configuration of the polyatomic system depending notably on a geometrical structure of the polyatomic system;
the configuration inputs received comprise structural inputs to modify a geometrical structure of the poly atomic system; and
each of the calculations is an iterative electronic structure calculation, started based on a latest updated configuration of the polyatomic system that was available before said one or more processors were able to start said each of the calculations;
and wherein:
obtaining comprises obtaining, upon completion of said each of the calculations, an energy corresponding to a latest updated configuration based on which said each of the calculations was started; the surrogate potential approximating said energy (E) for said latest updated configuration.

5. The method according to claim 2, wherein:
said at least one third frequency comprises a third frequency and a fourth frequency, each being respectively associated to a first type of feedback and a second type of feedback, the latter involving a force feedback device;
the first frequency is equal to the third frequency and is between 10 and 100 Hz; and
the fourth frequency is between 0.1 and 10.0 kHz.

6. The method according to claim 1, wherein
providing the at least one type of feedback comprises providing a first type of feedback, whereby a dynamic relaxation of the MPS is computed based on:
a last surrogate function obtained; and
a last updated configuration that was available before starting to compute said dynamic relaxation, the computed dynamic relaxation causing to change a configuration of the MPS as it relaxes, to obtain a changed configuration to be received as configuration inputs while receiving configuration inputs to modify a configuration of the MPS.

7. The method according to claim 6, wherein:
the UIS comprises a display,
and wherein the method further comprises:
displaying on the display configurations of the MPS being modified as per the computed dynamic relaxation and the received user inputs.

8. The method according to claim 6, wherein:
the configuration inputs received comprise both the user inputs and changes in the configuration of the MPS due to the computed dynamic relaxation;

the MPS is a system comprising multiple, interacting components;
the user inputs received are restricted to a first subset of the interacting components; and
the dynamic relaxation is restricted to a second subset of the interacting components that is distinct from said first subset.

9. The method according to claim 1, wherein:
repeatedly providing at least one type of feedback comprises sampling the configurations being updated at a frequency that is equal to a frequency at which the configurations of the MPS are displayed.

10. The method according to claim 9, wherein
evaluating a last surrogate function obtained and/or a function derived from it comprises checking for a last surrogate function obtained at that same frequency, equal to the frequency at which the configurations of the MPS are updated.

11. The method according to claim 1, wherein:
the UIS further comprises a force feedback device;
the user inputs are received at least partly via the force feedback device; and
providing at least one type of feedback comprises providing a second type of feedback via the force feedback device by sampling the configurations being updated and evaluating, at a fourth frequency, a last surrogate function obtained or a function derived therefrom, according to the sampled configurations, wherein the second type of feedback is a force feedback.

12. The method according to claim 11, wherein
each surrogate function obtained upon completion of each computation is constrained to be a continuously differentiable, strictly convex function, bounded from below.

13. The method according to claim 11, wherein
the user inputs are received via the force feedback device by selecting a component of the MPS and the second type of feedback is a force feedback as to a force experienced by a component of the MPS as selected via the force feedback device.

14. The method according to claim 11, wherein
the user inputs are received via the force feedback device by selecting a component of the MPS and moving the selected component to modify a configuration of the MPS.

15. The method according to claim 1, wherein:
a duration of each of the repeatedly executed computations is inherently unpredictable, owing to a method used for said computations.

16. The method according to claim 15; wherein
the MPS is a polyatomic system of atoms or ions interacting with each other;
said configurations are electronic configurations of the atoms or ions of the MPS, which electronic configurations notably depend on a structure of the polyatomic system;
repeatedly computing a state of the MPS comprises repeatedly executing calculations of a state of the MPS, each of the calculations being an iterative electronic structure calculation; and
the method used for said calculations is an ab initio quantum chemistry method.

17. A computerized system for providing real-time feedback to a user from states of a model physical system, or MPS, wherein the computerized system comprises one or more processors; a user interface system; or UIS, and stores a computerized method, which, upon execution via the one or more processors, causes the system to:

repeatedly receive configuration inputs to modify a configuration of the MPS, said inputs including user inputs received via said UIS; and while receiving said configuration inputs:

update configurations of the NIPS based on the configuration inputs received; and repeatedly compute a state of the MPS, whereby each computed state corresponds to a latest updated configuration that was available before starting to compute said each computed state; and while repeatedly computing a state of the MPS:

obtain, upon completion of each computation: a surrogate function approximating a function of said each computed state; and repeatedly provide via the UIS at least one type of feedback in respect to said user inputs received, by sampling the configurations being updated; and evaluating a last surrogate function obtained, and/or a function derived from the last surrogate function obtained, according to the sampled configurations, at a frequency compatible with real-time user-interactivity.

18. A computer program product for providing real-time feedback to a user from states of a model physical system, or MPS; the computer program product comprising a non-transitory computer readable storage medium having program instructions embodied therewith, the program instructions executable by one or more processors of a computerized system that comprises a user interface system, or UIS, to cause the system to:

repeatedly receive configuration inputs to modify a configuration of the MPS, said inputs including user inputs received via said UIS; and while receiving said configuration inputs:

update configurations of the MPS based on the configuration inputs received; and repeatedly compute a state of the MPS, whereby each computed state corresponds to a latest updated configuration that was available before starting to compute said each computed state; and while repeatedly computing a state of the MPS:

obtain, upon completion of each computation: a surrogate function approximating a function of said each computed state; and repeatedly provide via the UN at least one type of feedback in respect to said user inputs received, by sampling the configurations being updated; and evaluating a last surrogate function obtained, and/or a function derived from the last surrogate function obtained, according to the sampled configurations, at a frequency compatible with real-time user-interactivity.

19. The system according to claim 18, wherein the UIS further comprises a force feedback device, whereby the system is further configured to:

receive said user inputs at least partly via the force feedback device; and provide a second type of feedback as a force feedback via the force feedback device by sampling the configurations being updated, in operation, and evaluating, at a fourth frequency, a last surrogate function obtained or a function derived therefrom, according to the sampled configurations.

20. The system according to claim 19, wherein the system is further configured to receive said user inputs via the force feedback device upon a user selecting a component of the MPS, whereby the second type of feedback is a force feedback as to a force experienced by a component of the MPS as selected via the force feedback device.

* * * * *